United States Patent [19]
Ochi

[11] Patent Number: 5,134,362
[45] Date of Patent: Jul. 28, 1992

[54] APPARATUS FOR DETECTING FAILURE IN POWER SYSTEM

[75] Inventor: Naoki Ochi, Amagasaki, Japan

[73] Assignee: Mitsubishi Denki Kabushiki Kaisha, Tokyo, Japan

[21] Appl. No.: 681,055

[22] Filed: Apr. 5, 1991

[30] Foreign Application Priority Data

Apr. 13, 1990 [JP] Japan .................................. 2-98799

[51] Int. Cl.⁵ .............................................. G01R 31/00
[52] U.S. Cl. .................................. 324/96; 324/117 R; 324/158 R; 324/158 D; 324/244
[58] Field of Search .................. 324/96, 117 R, 244.1, 324/260, 512, 522; 356/364, 368; 350/96.1, 96.15, 96.23; 250/225, 227.14, 227.17; 455/610, 612; 359/241, 321, 322

[56] References Cited

U.S. PATENT DOCUMENTS

| | | | |
|---|---|---|---|
| 4,070,622 | 1/1978 | Harms et al. | 324/96 |
| 4,894,608 | 1/1990 | Ulmer, Jr. | 324/96 |
| 4,916,387 | 4/1990 | Miller | 324/117 R |
| 4,947,107 | 8/1990 | Doerfler et al. | 324/96 |
| 4,973,899 | 11/1990 | Jones et al. | 324/96 |

OTHER PUBLICATIONS

IEEE Journal of Quantum Electronics, vol. QE-18, No. 10, Oct. 1982, pp. 1619-1623, K. Kyuma et al., "Fiber Optic Measuring System for Electric Current by Using a Magnetooptic Sensor".

IEEE Transactions on Power Delivery, vol. PWRD-2, No. 1, Jan. 1987, pp. 87-93, T. Mitsui et al., "Development of Fiber-Optic Voltage Sensors and Magnetic-Field Sensors".

Primary Examiner—Vinh Nguyen
Attorney, Agent, or Firm—Oblon, Spivak, McClelland, Maier & Neustadt

[57] ABSTRACT

At both ends parts of a specified section of a high tension line and close to it, a first Faraday device and a second Faraday device are disposed, and an output end of the first Faraday device is connected to the input end of the second Faraday device through a polarization plane retaining type optical fiber. A light having a linear-polarized polarization plane is inputted from a polarizer to the input end of the first Faraday device. The light output from the second Faraday device is led through an analyzer to a photoelectric device, whose output is processed by an electric circuit consisting of only one band-pass filter, only one DC filter, only one divider, and a judgment circuit.

6 Claims, 5 Drawing Sheets

FIG. 4
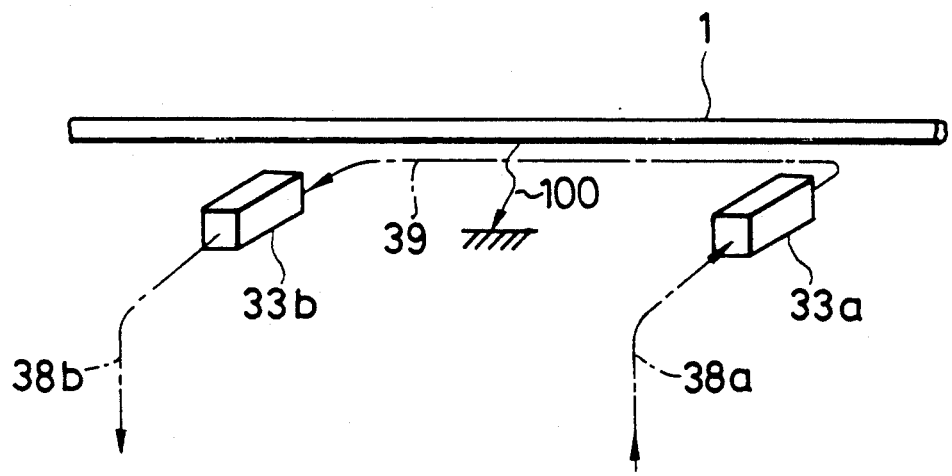
FIG.5(C)  FIG.5(B)  FIG.5(A)
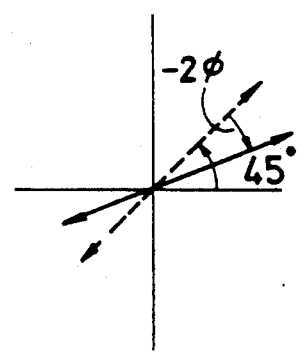 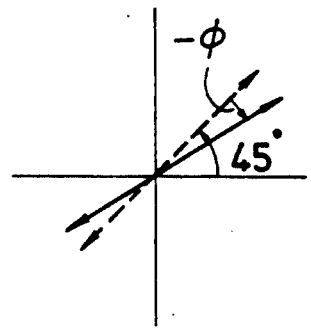 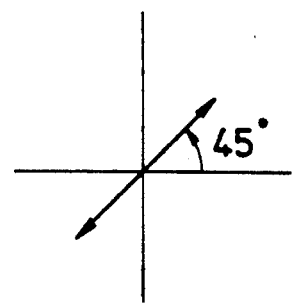

APPARATUS FOR DETECTING FAILURE IN POWER SYSTEM

FIELD OF THE INVENTION AND PRIOR ART STATEMENT

1. Field of the Invention

The present invention relates to an improvement in an apparatus for detecting failure in power systems, and more particularly to an improvement of the apparatus utilizing Faraday devices disposed close to a high tension line so as to receive magnetic field around the high tension line, wherein the Faraday devices are connected to a light emitting device and photoelectric device which are disposed at a position of ground potential by optical fibers.

2. Description of the Prior Art

Detection of failure in power line by utilizing Faraday effect in a magnetic field around high tension line has been widely used in recent years. For instance the circuitry of FIG. 7, which is the configuration of apparatus for detecting failure in a power system disclosed in the Japanese unexamined published patent application Hei 1-196579 (Tokkai Hei 1-196579). In FIG. 7, close to a high tension line 1, a first detection unit comprising a first polarizer 12a, a first Faraday device 13a and a first analyzer 14a are disposed at one end part of a specified section of the high tension line 1. Also close to the high tension line 1 at the other end part of the specified section, a second detection unit comprising a second polarizer 12b, a second Faraday device 13b and a second analyzer 14b are disposed. Light output end of a first light emitting device 11a is connected by an optical fiber to the light input end of the polarizer 12a. Similarly, the light output end of a second light emitting device 11b is connected through a second optical fiber 16b to the light input end of the second polarizer 12b.

Output end of the first analyzer 14a is connected through a third optical fiber 17a to the light input end of a first photoelectric device 15a. The light output end of the second analyzer 14b is connected through a fourth optical fiber 17b to the light input end of a second photoelectric device 15b. The output of the first photoelectric device 15a is led to a first band-pass filter 21a and also to a first DC filter 22a. And the output of the first band-pass filter 21a is divided by the output of the first DC filter 22a, by a first divider 23a. The output of the second photoelectric device 15b is led to a second band-pass filter 21b and also to a second DC filter 22b. And the output of the second band-pass filter 21b is divided by the output of the second DC filter 22b, by the second divider 23b.

Output of the first divider 23a and output of the second divider 23b are led to a subtracter 24 which makes a subtraction between the outputs of the first divider 23a and the second divider 23b. Output of the subtracter 24 is led to a judgment circuit 25, which issues a judgment signal for failure detection based on the subtraction result of the subtracter 24.

The operation of the prior art apparatus of FIG. 7 is as follows. Lights emitted from the first light emitting device 11a and the second light emitting device 11b are led through the first optical fiber 16a and the second optical fiber 16b to the first polarizer 12a and to the second polarizer 12b, respectively. The lights are changed to linear-polarized lights after passing through the first polarizer 12a and the second polarizer 12b, respectively. These linear polarized lights are subject to Faraday effect, that is polarization planes are rotated corresponding to magnetic intensities induced in the first Faraday device 13a and in the second Faraday device 13b, by currents flowing in the high tension line 1. The revolved polarization planes are then detected by the first analyzer 14a and the second analyzer 14b, respectively.

The output lights from the first analyzer 14a and the second analyzer 14b are led to the first photoelectric device 15a and the second photoelectric device 15b, which convert analyzed light signals to electric signals, respectively. The first band-pass filter 21a and the second band-pass filter 21b pass AC components of the photoelectric converted signals. A first DC filter 22a and the second DC filter 22b pass DC components of the photoelectric converted signal, respectively. These DC components correspond to cases wherein no magnetic field is applied to the Faraday devices 13a, 13b. The AC components correspond to magnetic field intensity applied to the Faraday devices 13a, 13b. By dividing the AC components outputted from the band-pass filters 21a and 21b by DC components outputted from the DC filters 22a and 22b by the first divider 23a and the second divider 23b, respectively, measurement errors due to difference of light attenuations are removed. The outputs of the first divider 23a and the second divider 23b are subject to subtraction by the subtracter 24. Therefore, if there is no failure of the high tension line 1, both high tension currents at the first position near the first Faraday device 13a and at the second position near the second Faraday device 13b have the same phases and intensities. Therefore, the output of the first divider 23a and second divider 23b are substantially equal to each other, and hence the output of the subtracter 24 is substantially zero. Therefore, at reception of the substantially zero output from the subtracter 24, the judgement circuit 25 judges that there is no failure of the high tension power line 1 in the specified section.

Next, if there is a grounding failure on the high tension line 1 of the specified section, there is a flowing-in of currents from both ends of the specified section or from one end of the specified section. In case currents flow in from both ends, the currents at both end parts of the specified section have opposite phases to each other and their intensities are usually different. Therefore, output signal of the subtracter 24 corresponds to sum of absolute values of current at both ends of the specified section of the high tension line 1. Then, output of the judgment circuit 25 rises above a predetermined level. And by finding a rise of output level of the judgment circuit 25, a failure on the high tension line in the specified section is judged.

The prior art apparatus for detecting failure in power system such as above-mentioned one has the following problems. The prior art apparatus of FIG. 7 needs four lines of long optical fibers from the high tension positions to the ground potential positions. Furthermore, the prior art apparatus of FIG. 7 needs two light emitting devices and two photoelectric devices. Furthermore, the electronic circuit on the ground potential positions has such a complicated configuration that two band-pass filters and two DC filters, two dividers, a subtracter and a judgment circuit are necessary.

OBJECT AND SUMMARY OF THE INVENTION

Therefore the present invention proposes to reduce the number of long optical fiber lines between the ground potential positions to the high tension positions and to reduce numbers of component electronic circuits and of optical and electronic devices, thereby much simplifying the configuration and reducing cost of the system.

In order to solve the above-mentioned problem, the apparatus for detecting failure in power system in accordance with the present invention comprises:

a first Faraday device disposed close to a high tension line at a position of one end part of a specified section of the high tension line, a second Faraday device provided close to the high tension line at a position of the other end part of the specified section, a polarization-plane-retaining optical fiber which connects output end of the first Faraday device and input end of the second Faraday effect device, a light-emitting device disposed at a position of the ground potential, a polarizer which produces a linear-polarized light from light emitted by the linear-emitting device and inputs the linear-polarized light to the first Faraday effect device, an analyzer which analyzes light of another linear-polarized light outputted from the second Faraday device, a photoelectric device disposed at the position of the ground potential and converts light outputted by the analyzer into electric signal, and a judgment circuit for judging existence of failure of the high tension line by calculating information of the electric signal.

The feature of the present invention is that: at both end parts of a specified section of a high tension line and close to it, a first Faraday device and a second Faraday device are disposed, and the output end of the first Faraday device is connected to the input end of the second Faraday device through a polarization plane retaining type optical fiber; a light having a linear-polarized polarization plane is inputted from a polarizer to the input end of the first Faraday device; the light output from the second Faraday device is led through an analyzer to a photoelectric device, whose output is processed by electric circuit comprising only one band-pass filter, only one DC filter, only one divider, and a judgment circuit.

According to the present invention system, polarization plane rotations by the first Faraday device and the second Faraday device are summed, since the two Faraday devices are optically series-connected by means of the polarization-plane-retaining optical fiber, whereby the numbers of polarizer, analyzer, photoelectric device, band-pass filter, DC filter and divider are all halved.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG. 4 is a schematic configuration diagram showing the operation in case of grounding failure.

FIG. 5 shows polarization plane rotation angles in the case of FIG. 4.

DESCRIPTION OF THE PREFERRED EMBODIMENTS

Preferred embodiments of the present invention are described with reference to the drawings, FIG. 1 through FIG. 6.

Figure 1:
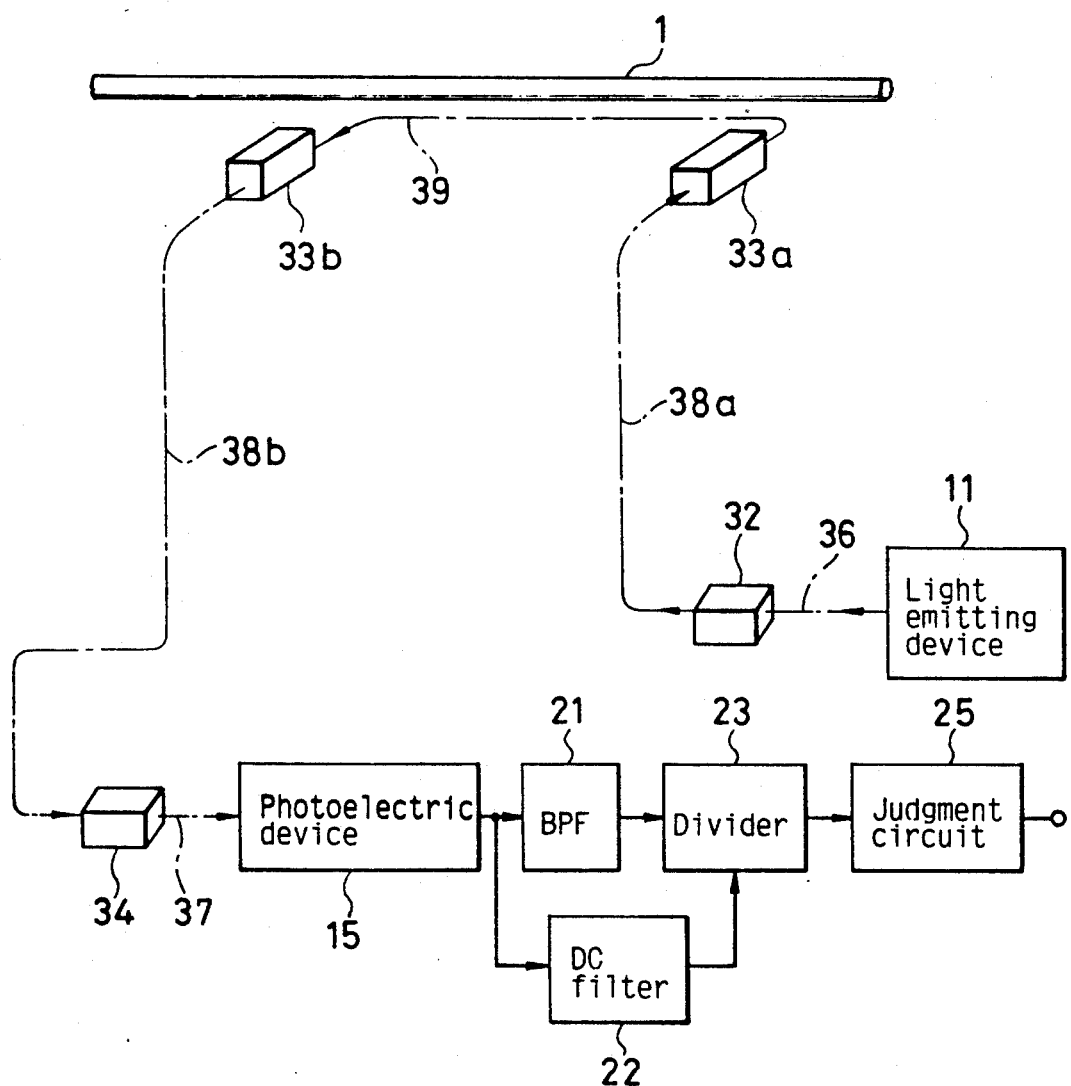
FIG. 1 is a system and circuit combination diagram of a first preferred embodiment of the present invention.

FIG. 1 shows a first preferred embodiment. As shown in FIG. 1, close to a high tension line 1, a first Faraday device 33a is disposed at one end part of a specified section of the high tension line 1. Also close to the high tension line 1, at the other end part of the specified section, a second Faraday device 33b is disposed. The light output end of the first Faraday device 33a is connected to the light input end of the second Faraday device 33b through a first polarization-plane-retaining optical fiber 39.

On the ground potential position, a light emitting device 11 and a polarizer 32 are provided being connected by an ordinary optical fiber 36 which does not retain polarization plane. The output end of the polarizer 32 is connected through a second polarization-plane-retaining optical fiber 38a to the input end of the first Faraday device 33a to the input end of the first Faraday device 33a.

Furthermore, on the ground potential position, an analyzer 34 and a photoelectric device 15 are provided being connected by an ordinary optical fiber 37 which does not retain polarization plane. The output end of the second Faraday device 33b is connected to the input end of the analyzer 34 by a third polarization-plane-retaining optical fiber 38b.

The output of the photoelectric device 15 is led to a band-pass filter 21 which passes components of the narrow frequency around the power frequency only and also to a DC filter 22 which passes DC component only. Output of the band-pass filter 21 and the output of the DC filter 22 are led to a divider 23. So that, output of the bandpass filter 21 is divided by the output of the DC filter, by the divider 23.

Output of the divider 23 is led to a judgment circuit 25 which issues a judgment signal for failure detection judgment based on the output of the divider 23.

The operation of the above-mentioned preferred embodiment of FIG. 1 is as follows.

Light emitted by the light emitting device 11 is led through the optical fiber 36 to the polarizer 32 and changed therein to a linear-polarized light. The linear-polarized light outputted from the polarizer 32 is transmitted through the second polarization-plane-retaining optical fiber 38a to the first Faraday device 33a disposed at a high potential position, which is close to the high tension line 1. Since the first Faraday device 33a is in a very strong AC magnetic field induced by a large power current in the high tension line 1, the inputted linear-polarized light is subject to a Faraday effect, and the linear polarized plane is rotated. The rotated and output linear-polarized light is then transmitted through the first polarization-plane-retaining optical fiber 39 to the second Faraday device 33b.

The second Faraday device 33b is also in a strong AC magnetic field induced by the large power current in the high tension line 1. Therefore the rotated linear-polarized light inputted from the first polarization-plane-retaining optical fiber 39 is again rotated in the second Faraday device 33b. The twice-rotated linear-polarized light is further transmitted through the third optical fiber 38b to the analyzer 34, which outputs a light, which is modulated responding to the rotations of the polarization plane, to the photoelectric device 15. The photoelectric device 15 converts the information of modulated light to the electric signal. From the output signal of the photoelectric device is made AC component and DC component by passing through the band-pass filter 21 and the DC filter 22, respectively. The AC component corresponds to a case that AC magnetic field is applied to either one of the first Faraday device 33a or the second Faraday device 33b or to the other case that AC magnetic fields applied to the Faraday devices 33a and 33b are in opposite directions to each other. The DC component from the DC filter 22 is output when neither the first Faraday device 33a nor the second Faraday device 33b receive the magnetic field or when both Faraday devices receive the magnetic fields of the same direction.

Therefore by dividing the AC component by the DC component by the divider 23, the measurement error due to difference of light attenuations in the optical fibers 36, 37, 39, 38a and 38b can be eliminated. The output of the divider 23 is led to the judgment circuit 25, wherein when a ratio of the AC component and the DC component is under a predetermined level a judgement of no failure in the specified section of the high tension line 1 is judged, and on the contrary when the ratio is above the predetermined ratio the judgment is made that there is a grounding failure in the specified section.

Next, a detailed explanation is made on the operations about rotation of the polarization plane of the linear-polarized light in the first Faraday device 33a and the second Faraday device 33b.

Figure 2:
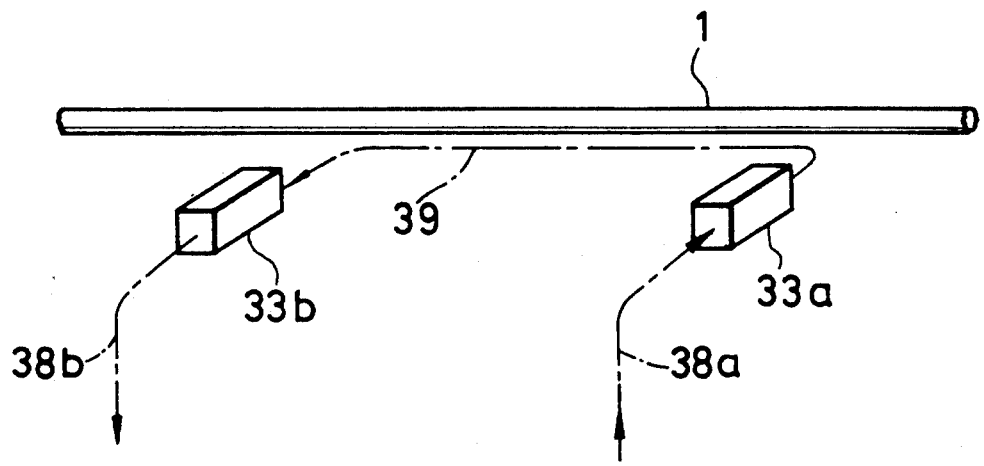
FIG. 2 is a schematic configuration diagram showing the operation in case of no failure.

FIG. 2 shows the case where there is no failure on the high tension line 1 and therefore currents I, I at both ends of the specified section shown in FIG. 2 has the same value.

1. When there is no grounding failure on the high tension line 1.

Figures 3A, 3B, 3C:
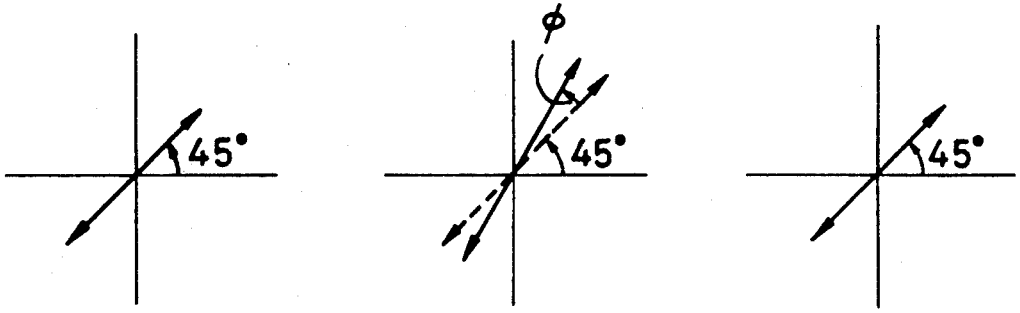
FIG. 3 shows polarization plane rotation angles in the case of FIG. 2.

FIG. 3(A), FIG. 3(B) and FIG. 3(C) are charts showing the rotations of polarization plane at various positions of the system in the case of operation of FIG. 2. It is provided that the polarization plane of the linear polarized light inputted to the first Faraday device 33a through the second optical fiber 38a is at an angle of 45° with respect to the horizontal plane, as shown in FIG. 3(A). Since there is no grounding failure on the high tension line 1, the intensity and phase of currents I, I at both ends of the specified section whereat the first Faraday device 33a and the second Faraday device 33b are disposed, respectively. Hence, the field intensities and the directions of magnetic fields at both positions of the first Faraday device 33a and the second Faraday device 33b are the same. When the input light having 45° polarization plane is incident to the first Faraday device 33a, the polarization plane is rotated by the angle $\phi$ as shown in FIG. 3(B) when the light is outputted therefrom. Next, the light whose polarization plane has been rotated by $\phi$ is transmitted through the first optical fiber 39 to the second Faraday device 33b. The intensity and direction of the magnetic field at the position of the second Faraday device 33b is the same as those of the first Faraday device 33a but the direction of travel of the linear-polarized light in the Faraday device 33b is opposite to the case in the first Faraday device 33a, and hence the polarization plane of the linear-polarized light is rotated by the angle of $-\phi$ in the second Faraday device 33b. As a result, as shown in FIG. 3(C), the light output from the output end of the second Faraday device 33b has the polarization plane which has the same angle (45°) as that of the incident linear polarized light to the first Faraday device 33a. Therefore, the AC component which is resultant from the rotations in the Faraday devices 33a and 33b becomes substantially zero, hence rendering the ratio of AC component/DC component outputted from the divider 23 substantially zero. Therefore the judgment circuit 25 judges that there is no grounding failure in the specified segment of the high tension line 1.

2. When there is grounding failure in the specified section of the high tension line.

FIG. 4 shows the case wherein there is a grounding failure 100 in the specified segment of the high tension line 1, and therefore the currents Ia and Ib at the first end and the second end of the specified section of the high tension line 1 are not equal to each other. FIG. 5(A), FIG. 5(B) and FIG. 5(C) are charts of polarization planes at various positions of the system in the operation of FIG. 4. In general, when there is a grounding failure 100, the grounding currents flow in from both sides with respect to the point of the grounding failure 100 on the high tension line of the specified section. When the currents flow in from both sides, in general the currents, hence magnetic fields have opposite phases from each other and different intensities at the parts of the first Faraday device 33a and the second Faraday device 33b. However, for the convenience and simplicity of explanation, let us provide that the currents at both parts of the first Faraday device 33a and the second Faraday device 33b have opposite phases and the same current intensities. Under such condition, the first Faraday device 33a and the second Faraday device 33b are in the magnetic fields of opposite direction and same intensities. Then, when the linear polarized light shown in FIG. 5(A) is incident to the first Faraday device 33a, the polarized-light is subject to rotation of the polarization plane by $-\phi$ by the magnetic field in the first Faraday device as shown in FIG. 5(B). The output light having the rotated polarization plane is transmitted through the second polarization plane retaining optical fiber 39 to the second Faraday device 33b. In the second Faraday device 33b, the magnetic field intensity is the same as that of the first Faraday device 33a, and the direction of the magnetic field is opposite to that of the first Faraday device 33a because direction of the current on the high tension line 1 is opposite. Furthermore, the direction of the light travel in the second Faraday device 33b is opposite to the case of the first Faraday device 33a. Therefore, the angle of the polarized light is further rotated by the angle of $-\phi$, thereby resulting in the total rotation angle $-2\phi$ at the output end of the second Faraday device 33b, as shown in FIG. 5(C). The light output having the large rotation angle is analyzed by the analyzer 15, and the AC component given by the band-pass filter 21 has a considerable amount and hence the AC/DC ratio becomes above predetermined level.

Therefore the judgment circuit 25 issues a judgement output that there is a grounding failure in the specified section on the high tension line 1.

Figure 6:
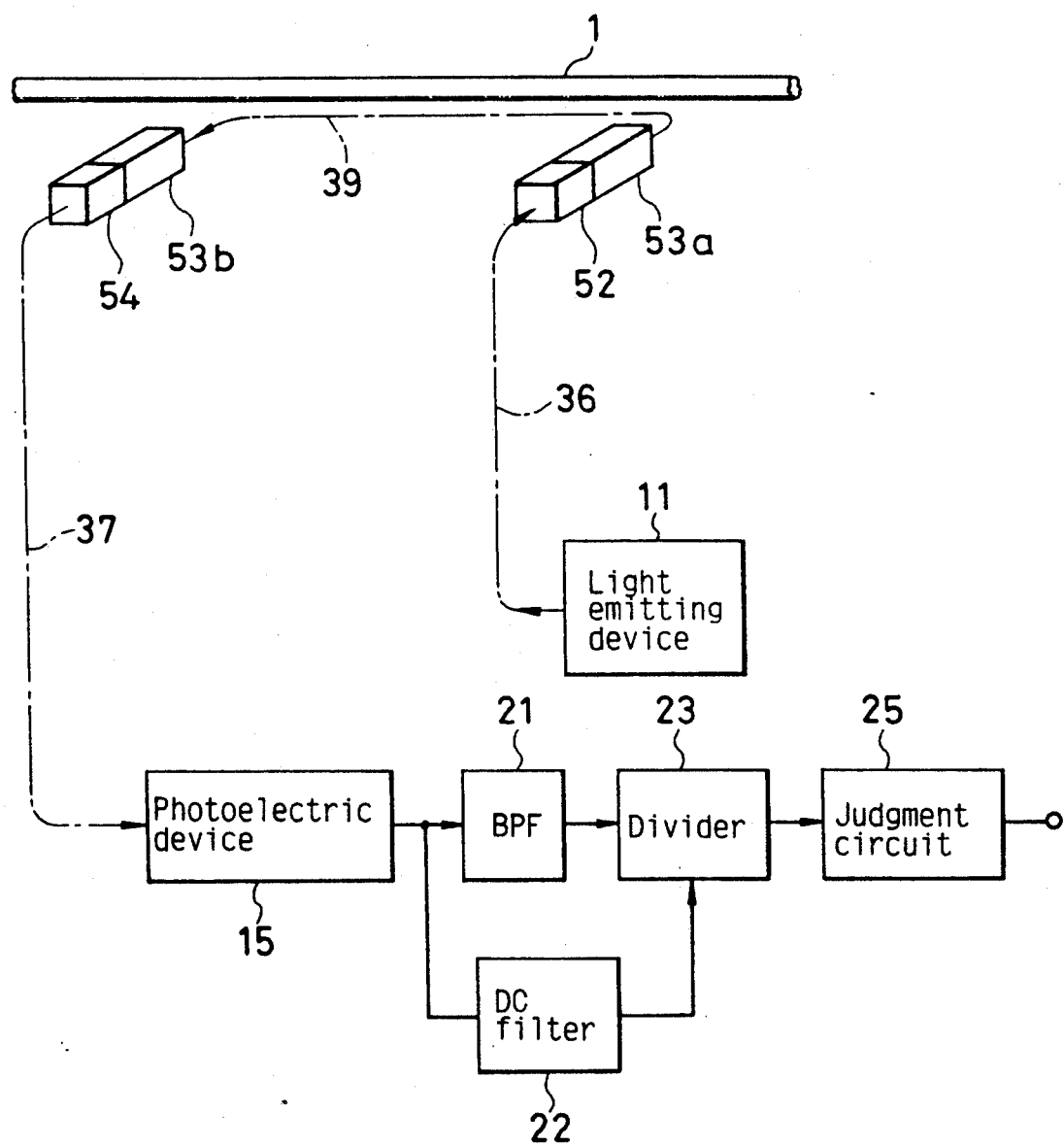
FIG. 6 is a system and circuit combined diagram of another preferred embodiment.
Figure 7:
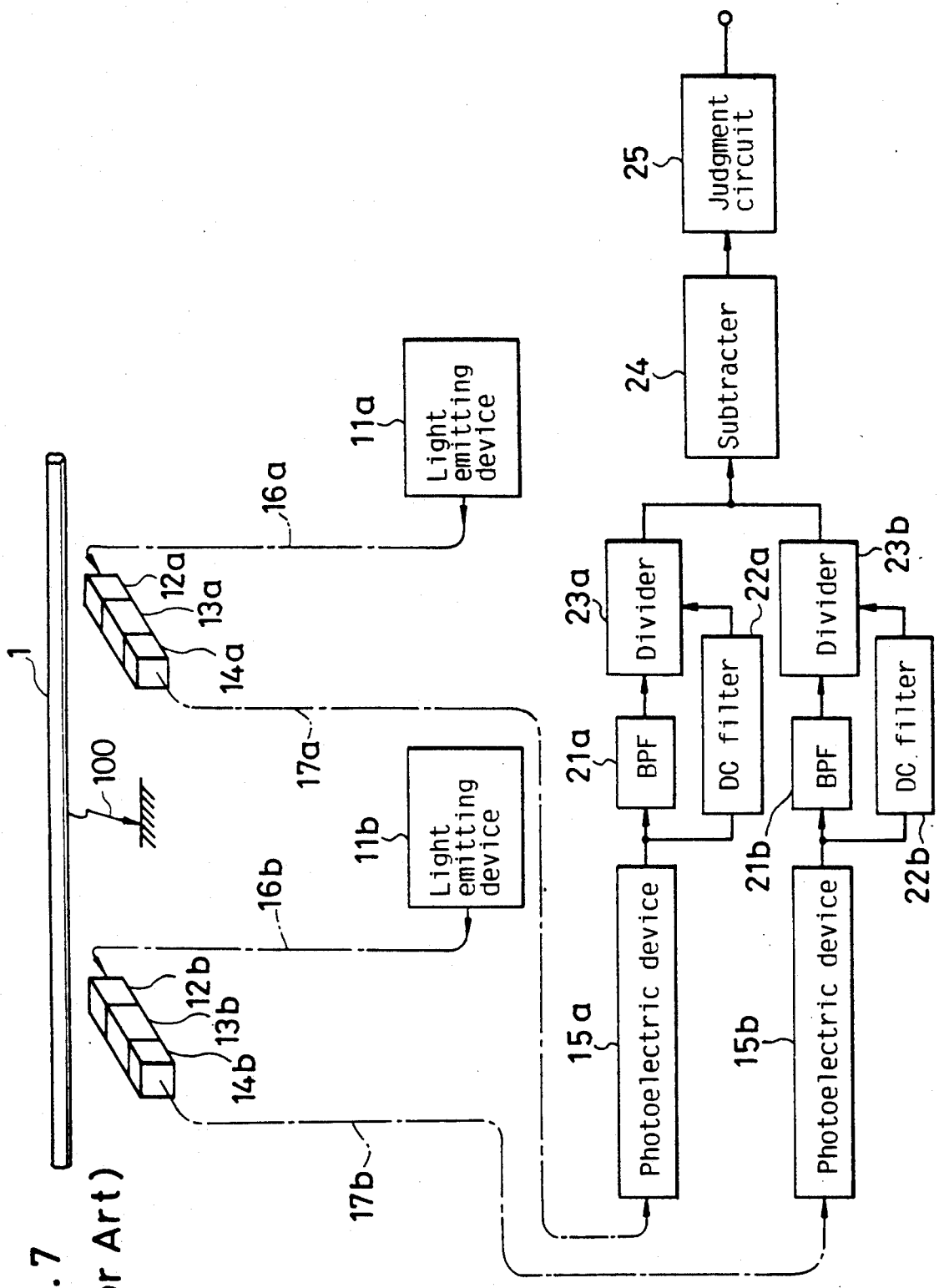
FIG. 7 is the system and circuit combined diagram of the prior art.

FIG. 6 shows a second embodiment. Corresponding parts and components to the first embodiment are shown by the same numerals and marks, and the descriptions thereon made in the first embodiment similarly apply. Differences and features of this first embodiment from the first embodiment are as follows. The feature of this embodiment is that a polarizer 52 and an analyzer 54 are disposed at a position close to the high tension line 1, directly coupling to the first Faraday device 33a and the second Faraday device 33b, respectively. The light input end of the polarizer 52 is connected to the light emitting device 11 by an ordinary optical fiber 36. The light output end of the analyzer 54 is connected to the light input end of the photoelectric device 15 by an ordinary optical fiber 37. These ordinary optical fibers 36 and 37 do not retain polarization plane of light.

The operation of this second embodiment of FIG. 6 is substantially the same as that of the first embodiment of FIG. 1.

The technical advantage of this embodiment over the first embodiment is that the polarization plane retaining optical fiber is necessary only as the optical fiber 39 which connects the first Faraday device 33a and the second Faraday device 33b, and other two optical fibers 36 and 37 may be much cheaper ordinary optical fibers.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. An apparatus for detecting failure in power system comprising:
    a first Faraday device disposed close to a high tension line at a position of one end part of a specified section of said high tension line,
    a second Faraday device provided close to said high tension line at a position of the other end part of said specified section,
    a polarization-plane-retaining optical fiber which connects output end of said first Faraday device and input end of said second Faraday device,
    a light-emitting device disposed at a position of the ground potential,
    a polarizer which produces a linear-polarized light from a light emitted by said light-emitting device and inputs said linear-polarized light to said first Faraday device,
    an analyzer which analyzes a linear-polarized light outputted from said second Faraday device,
    a photoelectric device disposed at the position of the ground potential and converts light outputted by said analyzer into electric signal, and
    a judgment circuit for judging existence of failure of said high tension line by computing information of said electric signal.

2. An apparatus for detecting failure in power system in accordance with claim 1, wherein
    said polarizer is disposed at the position of the ground potential and
    output end of said polarizer is connected by a polarization-plane-retaining optical fiber to input end of said first Faraday device.

3. An apparatus for detecting failure in power system in accordance with claim 1, wherein
    said polarizer is disposed close to said high tension line and at the vicinity of said first Faraday device so as to receive output light of the latter to input end of the former.

4. An apparatus for detecting failure in power system in accordance with claim 1, wherein
    said analyzer is disposed at the position of the ground potential and
    output end of said second Faraday device is connected by a polarization-plane-retaining optical fiber to the input end of said analyzer.

5. An apparatus for detecting failure in power system in accordance with claim 1, wherein
    said analyzer is disposed close to said high tension line and at the vicinity of said second Faraday device so as to receive output light of the latter to input end of the former.

6. An apparatus for detecting failure in a power system comprising:
    a first Faraday device disposed at a first end part of a specified section of a high tension line and close thereto and a second Faraday device disposed at a second end part of said specified section of said high tension line and close thereto,
    a polarization plane retaining type optical fiber, through which an output end of the first Faraday device is connected to an input end of the second Faraday device,
    a light producing means including a polarizer for producing a light having a linear-polarized polarization plane which is inputted from said polarizer to the input end of said first Faraday device,
    an analyzer for receiving a light output signal from said second Faraday device,
    a photoelectric device for receiving a light output from said analyzer and
    an electric circuit for receiving an output from said photoelectric device, said electric circuit comprising only one band pass filter, only one dc filter, only one divider, and a judgment circuit.

* * * * *